US008928654B2

(12) United States Patent
Givon

(10) Patent No.: US 8,928,654 B2
(45) Date of Patent: Jan. 6, 2015

(54) METHODS, SYSTEMS, DEVICES AND ASSOCIATED PROCESSING LOGIC FOR GENERATING STEREOSCOPIC IMAGES AND VIDEO

(75) Inventor: Dor Givon, Tel Aviv (IL)

(73) Assignee: Extreme Reality Ltd., Herzliya Pituah (IL)

( * ) Notice: Subject to any disclaimer, the term of this patent is extended or adjusted under 35 U.S.C. 154(b) by 344 days.

(21) Appl. No.: 13/355,643

(22) Filed: Jan. 23, 2012

(65) Prior Publication Data

US 2012/0176477 A1 Jul. 12, 2012

Related U.S. Application Data

(63) Continuation-in-part of application No. 11/572,958, filed as application No. PCT/IL2005/000813 on Jul. 31, 2005, now Pat. No. 8,114,172, and a continuation-in-part of application No. 12/517,210, filed as application No. PCT/IL2007/000475 on Apr. 15, 2007, now Pat. No. 8,432,390.

(60) Provisional application No. 60/592,136, filed on Jul. 30, 2004, provisional application No. 61/435,311, filed on Jan. 23, 2011.

(51) Int. Cl.
*G06T 17/00* (2006.01)
*H04N 13/02* (2006.01)
*H04N 13/00* (2006.01)

(52) U.S. Cl.
CPC .............. *H04N 13/026* (2013.01); *G06T 17/00* (2013.01); *H04N 13/0011* (2013.01)
USPC ............................... 345/419; 345/420; 348/46

(58) Field of Classification Search
CPC ....... G06T 11/001; G06T 11/40; G06T 13/80; G06T 15/005; G06T 15/00
USPC ..................... 345/419, 420; 348/46, E13.074
See application file for complete search history.

(56) References Cited

U.S. PATENT DOCUMENTS 4,376,950 A 3/1983 Brown et al.
5,130,794 A 7/1992 Ritchey
(Continued)

FOREIGN PATENT DOCUMENTS

EP 1 115254 7/2001
JP 10-040418 2/1998
(Continued)

OTHER PUBLICATIONS

Carranza et al., "Free-Viewpoint Video of 1-39 Human Actors", Proc. of ACM Siggraph 2003, Jul. 27, 2003.
(Continued)

*Primary Examiner* — Kimbinh T Nguyen
(74) *Attorney, Agent, or Firm* — Vladmir Sherman; Professional Patent Solutions

(57) ABSTRACT

The present invention includes methods, systems, devices and associated processing logic for generating stereoscopic 3-Dimensional images and/or video from 2-Dimensional images or video. There may be provided a stereoscopic 3D generating system to extrapolate and render 2D complementary images and or video from a first 2D image and/or video. The complementary images and/or video, when combined with the first image or video, or a second complementary image or video, form a stereoscopic image of the scene captured in the first image or video. The stereoscopic 3D generation system may generate a complementary image or images, such that when a viewer views the first image or a second complementary image (shifted in the other direction from the first complementary image) with one eye and the complementary image with the other eye, an illusion of depth in the image is created (e.g. a stereoscopic 3D image).

11 Claims, 12 Drawing Sheets

(56) References Cited

U.S. PATENT DOCUMENTS

| | | |
|---|---|---|
| 5,515,183 A | 5/1996 | Hashimoto |
| 5,691,885 A | 11/1997 | Ward et al. |
| 5,703,704 A | 12/1997 | Nakagawa et al. |
| 5,745,719 A | 4/1998 | Falcon |
| 5,748,199 A * | 5/1998 | Palm .......................... 345/473 |
| 5,831,633 A | 11/1998 | Van Roy |
| 5,835,133 A | 11/1998 | Moreton et al. |
| 5,852,450 A | 12/1998 | Thingvold |
| 5,909,218 A | 6/1999 | Naka et al. |
| 6,115,482 A | 9/2000 | Sears et al. |
| 6,243,106 B1 | 6/2001 | Rehg et al. |
| 6,303,924 B1 | 10/2001 | Adan et al. |
| 6,317,130 B1 | 11/2001 | Ishikawa et al. |
| 6,388,670 B2 | 5/2002 | Naka et al. |
| 6,529,643 B1 | 3/2003 | Loce et al. |
| 6,545,663 B1 | 4/2003 | Arbter et al. |
| 6,554,706 B2 | 4/2003 | Kim et al. |
| 6,597,801 B1 | 7/2003 | Cham et al. |
| 6,657,670 B1 | 12/2003 | Cheng |
| 6,674,877 B1 | 1/2004 | Jojic et al. |
| 6,681,031 B2 | 1/2004 | Cohen et al. |
| 6,833,843 B2 | 12/2004 | Mojaver et al. |
| 6,906,687 B2 | 6/2005 | Werner |
| 7,061,492 B2 | 6/2006 | Carrai et al. |
| 7,061,532 B2 | 6/2006 | Silverstein |
| 7,116,330 B2 | 10/2006 | Marshall et al. |
| 7,123,292 B1 | 10/2006 | Seeger et al. |
| 7,184,589 B2 | 2/2007 | Okubo |
| 7,257,237 B1 | 8/2007 | Luck et al. |
| 7,308,112 B2 | 12/2007 | Fujimura et al. |
| 7,366,278 B2 * | 4/2008 | Fu et al. .......................... 378/4 |
| 7,429,997 B2 | 9/2008 | Givon |
| 7,738,725 B2 * | 6/2010 | Raskar et al. ................ 382/266 |
| 7,755,608 B2 | 7/2010 | Chang et al. |
| 7,783,118 B2 | 8/2010 | Zhou |
| 7,885,480 B2 | 2/2011 | Bryll et al. |
| 7,903,141 B1 | 3/2011 | Mariano et al. |
| 7,936,932 B2 | 5/2011 | Bashyam et al. |
| 7,978,917 B2 | 7/2011 | Lei et al. |
| 8,005,263 B2 | 8/2011 | Fujimura et al. |
| 8,036,494 B2 | 10/2011 | Chen |
| 8,094,873 B2 | 1/2012 | Kelusky et al. |
| 8,094,943 B2 | 1/2012 | Eaton et al. |
| 8,107,726 B2 | 1/2012 | Xu et al. |
| 8,111,284 B1 | 2/2012 | Givon |
| 8,114,172 B2 | 2/2012 | Givon |
| 8,237,775 B2 | 8/2012 | Givon |
| 8,432,390 B2 | 4/2013 | Givon |
| 8,462,199 B2 | 6/2013 | Givon |
| 2001/0007452 A1 | 7/2001 | Naka et al. |
| 2002/0191239 A1 | 12/2002 | Psaltis et al. |
| 2003/0007680 A1 | 1/2003 | Iijima et al. |
| 2004/0155962 A1 | 8/2004 | Marks |
| 2004/0161133 A1 | 8/2004 | Elazar et al. |
| 2004/0193413 A1 | 9/2004 | Wilson et al. |
| 2004/0228530 A1 | 11/2004 | Schwartz |
| 2005/0023448 A1 | 2/2005 | Ogawara et al. |
| 2005/0041842 A1 | 2/2005 | Frakes et al. |
| 2005/0063596 A1 | 3/2005 | Yomdin et al. |
| 2005/0166163 A1 | 7/2005 | Chang et al. |
| 2005/0232514 A1 | 10/2005 | Chen |
| 2005/0259870 A1 | 11/2005 | Kondo et al. |
| 2005/0271279 A1 | 12/2005 | Fujimura et al. |
| 2006/0010400 A1 | 1/2006 | Dehlin et al. |
| 2006/0056679 A1 | 3/2006 | Redert et al. |
| 2006/0104480 A1 | 5/2006 | Fleisher |
| 2006/0164230 A1 | 7/2006 | DeWind et al. |
| 2006/0187305 A1 | 8/2006 | Trivedi et al. |
| 2006/0294509 A1 | 12/2006 | Mital et al. |
| 2007/0098250 A1 | 5/2007 | Molgaard et al. |
| 2007/0183633 A1 | 8/2007 | Hoffmann |
| 2007/0183663 A1 | 8/2007 | Wang et al. |
| 2007/0236475 A1 | 10/2007 | Wherry |
| 2007/0259717 A1 | 11/2007 | Mattice et al. |
| 2007/0285419 A1 | 12/2007 | Givon |
| 2007/0285554 A1 | 12/2007 | Givon |
| 2008/0007533 A1 | 1/2008 | Hotelling |
| 2008/0013793 A1 | 1/2008 | Hillis et al. |
| 2008/0030460 A1 | 2/2008 | Hildreth et al. |
| 2008/0036732 A1 | 2/2008 | Wilson et al. |
| 2008/0037829 A1 | 2/2008 | Givon |
| 2008/0037869 A1 | 2/2008 | Zhou |
| 2008/0101722 A1 | 5/2008 | Bryll et al. |
| 2008/0104547 A1 | 5/2008 | Morita et al. |
| 2008/0111710 A1 | 5/2008 | Boillot |
| 2008/0143975 A1 | 6/2008 | Dennard et al. |
| 2008/0148149 A1 | 6/2008 | Singh et al. |
| 2008/0181499 A1 | 7/2008 | Yang et al. |
| 2009/0058833 A1 | 3/2009 | Newton |
| 2009/0062696 A1 | 3/2009 | Nathan et al. |
| 2009/0080715 A1 | 3/2009 | Van Beek et al. |
| 2009/0116732 A1 | 5/2009 | Zhou et al. |
| 2009/0141987 A1 | 6/2009 | McGarry et al. |
| 2010/0066735 A1 | 3/2010 | Givon |
| 2010/0111370 A1 | 5/2010 | Black et al. |
| 2010/0141802 A1 | 6/2010 | Knight et al. |
| 2010/0194862 A1 | 8/2010 | Givon |
| 2010/0208038 A1 | 8/2010 | Kutliroff et al. |
| 2010/0303290 A1 | 12/2010 | Mathe |
| 2010/0328351 A1 | 12/2010 | Tan |
| 2011/0052068 A1 | 3/2011 | Cobb et al. |
| 2011/0069152 A1 | 3/2011 | Wang et al. |
| 2011/0080496 A1 | 4/2011 | Givon |
| 2011/0129124 A1 | 6/2011 | Givon |
| 2011/0163948 A1 | 7/2011 | Givon et al. |
| 2011/0286673 A1 | 11/2011 | Givon et al. |
| 2011/0292036 A1 | 12/2011 | Sali et al. |
| 2012/0176414 A1 | 7/2012 | Givon |
| 2012/0176477 A1 | 7/2012 | Givon |
| 2012/0218183 A1 | 8/2012 | Givon et al. |
| 2013/0120319 A1 | 5/2013 | Givon |

FOREIGN PATENT DOCUMENTS

| | | |
|---|---|---|
| JP | 2001-246161 | 9/2001 |
| JP | 2002-216146 | 8/2002 |
| JP | 2004-062692 | 2/2004 |
| JP | 2006-040271 | 2/2006 |
| JP | 2007-531113 | 1/2007 |
| JP | 2007-302223 | 11/2007 |
| WO | WO 03/025859 | 3/2003 |
| WO | WO 03/039698 | 5/2003 |
| WO | WO 2004/013814 | 2/2004 |
| WO | WO 2004/094943 | 11/2004 |
| WO | WO 2005/114556 | 12/2005 |
| WO | WO 2006/011153 | 2/2006 |
| WO | WO 2006/099597 | 9/2006 |
| WO | WO 2008/126069 | 10/2008 |
| WO | WO 2011/033519 | 3/2011 |
| WO | WO 2013/069023 | 5/2013 |

OTHER PUBLICATIONS

Cheung G K M et al., "Shape-from-silhouette of articulated objects and its use for human body kinematics estimation and motion capture", Proceedings / 2003 IEEE Computer Society Conference on Computer Vision and Pattern Recognition, Jun. 18-20, 2003, Madison, Wisconsin.

Starck et al., "Model-based multiple view reconstruction of people", Proceedings of the Eight IEEE International Conference on Computer Vision. (ICCV). Nice, France, Oct. 13-16, 2003.

Molet T et al: "An animation interface designed for motion capture", Computer Animation '97 Geneva, Switzerland Jun. 5-6, 1997.

Kronrod B et al., "Optimized triangle mesh compression using prediction trees", Computer Graphics and Applications, 2000. Proceedings. the Eighth Pacific Conference on Hong Kong, China Oct. 3-5, 2000.

Theobalt C et al.,: "Enhancing silhouette-based human motion capture with 3D motion fields", Computer Graphics and Applications, 2003. Proceedings. 11th Pacific Conference on Oct. 8-10, 2003, Piscataway, NJ, USA, IEEE, Oct. 8, 2003.

Bregler C et al: "Tracking people with twists and exponential maps", Computer Vision and Pattern Recognition, 1998. Proceedings. 1998

(56) References Cited

OTHER PUBLICATIONS

IEEE Computer Society Conference on Santa Barbara, CA, USA Jun. 23-25, 1998, Los Alamitos, CA,USA,IEEE Comput. Soc, US, Jun. 23, 1998, pp. 8-15, XP010291718.
Sminchisescu et al. "Estimated Articulated Human Motion with Covariance Scaled Sampling". Published 2003.
Sappa et al. "Monocular 3D Human Body Reconstruction toward Depth Augmentation of Television Sequences". Published 2003.
Sminchisescu et al. "Human Pose Estimation from Silhouettes a Consistent Approach Using Distance Level Set". Published 2002.
Sminchisescu C et al: "Kinematic jump processes for monocular 3D human tracking", Proceedings / 2003 IEEE Computer Society Conference on Computer Vision and Pattern Recognition, Jun. 18-20, 2003, Madison, Wisconsin; [Proceedings of the IEEE Computer Conference on Computer Vision and Pattern Recognition], Los Alamitos, Calif. [U.A, vol. 1, Jun. 18, 2003, pp. 69-76, XP010644883, DOI: 10.1109/CVPR.2003.1211339 ISBN: 978-0-7695-1900-5.
Ren NG, "Digital Light Field Photography", Jul. 2006, (available at www.lytro.com/rennig-thesis.pdf).
D'Apuzzo N et al: "Modeling human bodies from video sequences", SPIE Proceedings, The International Society for Optical Engineering—SPIE, Bellingham, Washington, USA, vol. 3641, Jan. 1, 1998, pp. 36-47, XP002597223, ISSN: 0277-786X, DOI: 10.1117/12.333796.

\* cited by examiner

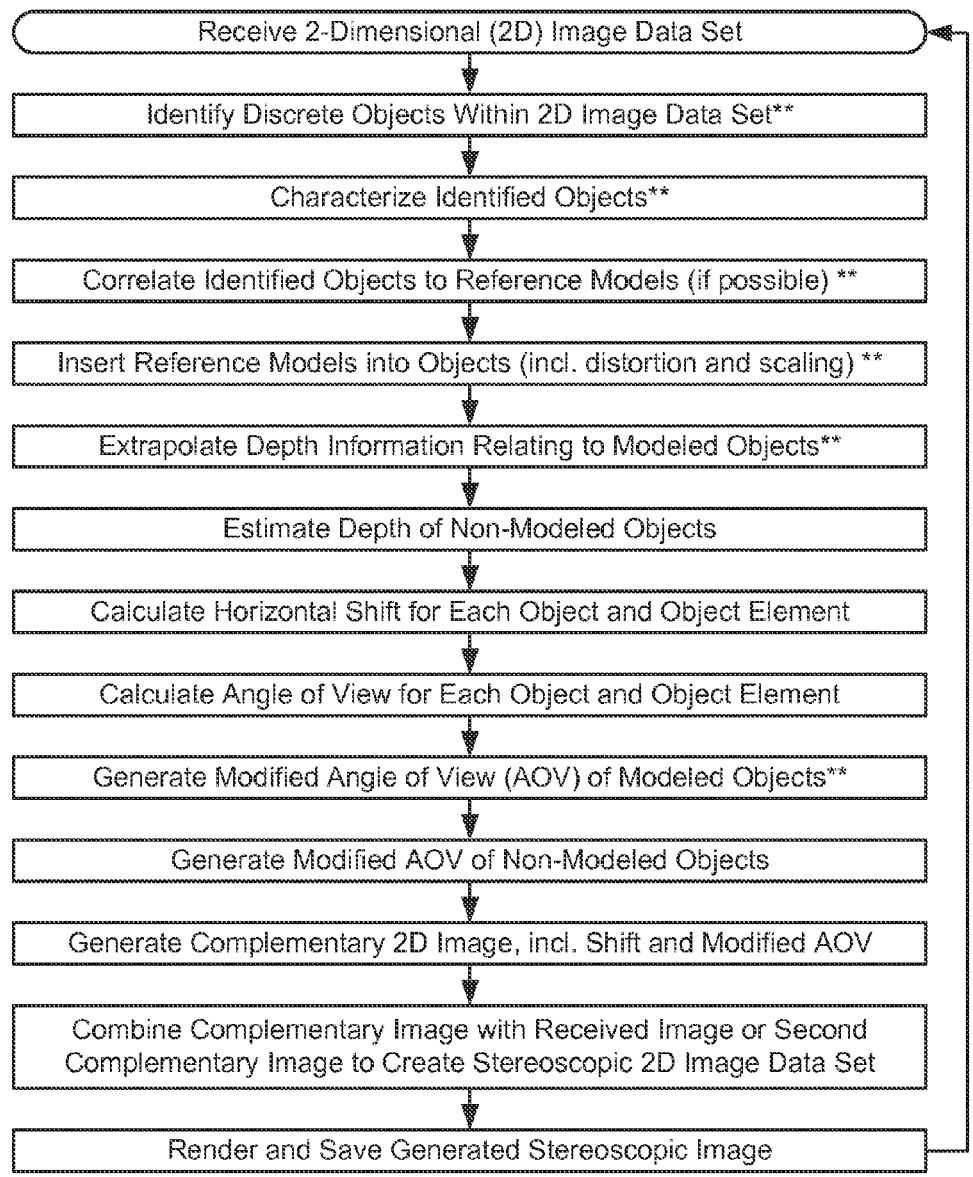

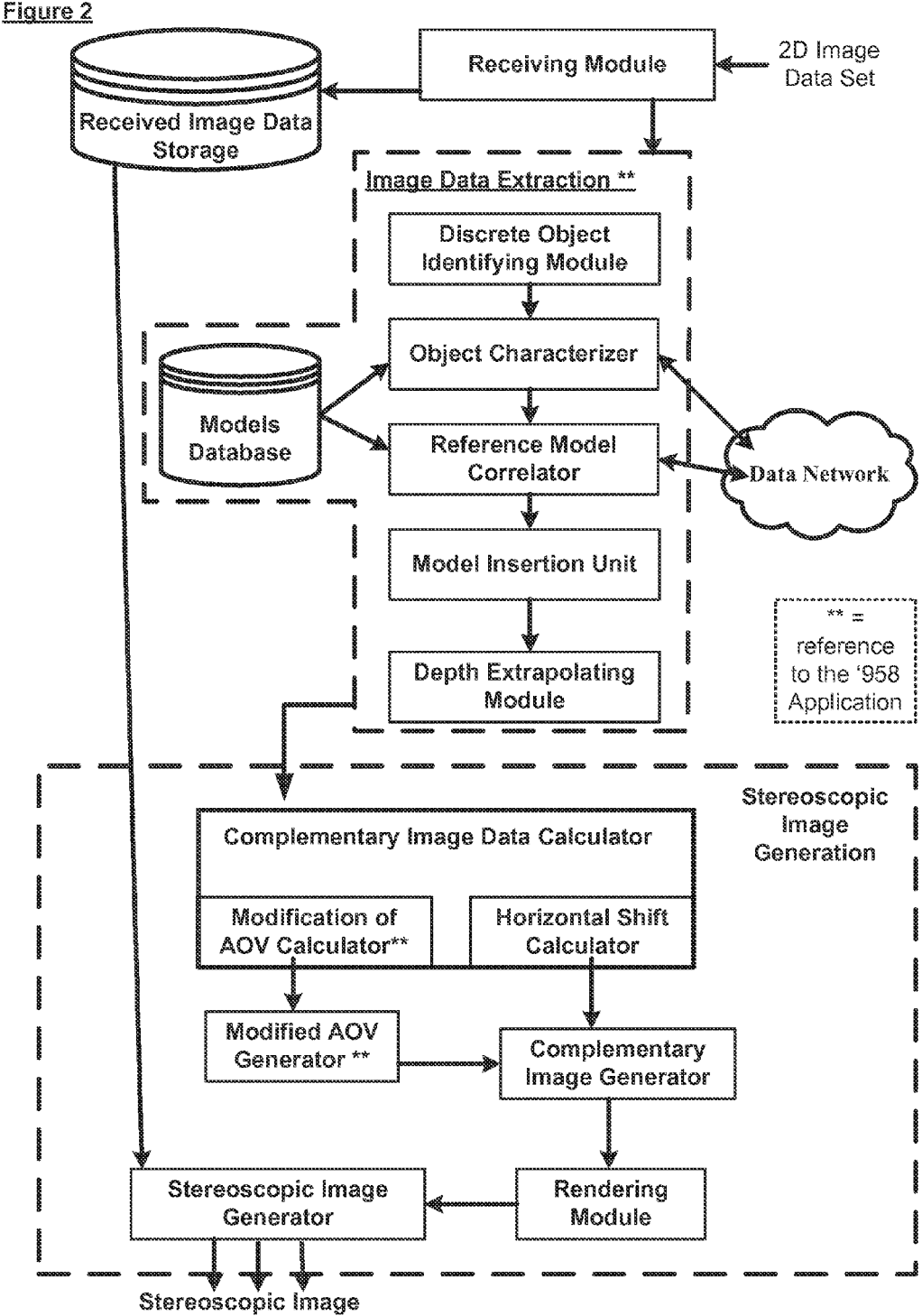

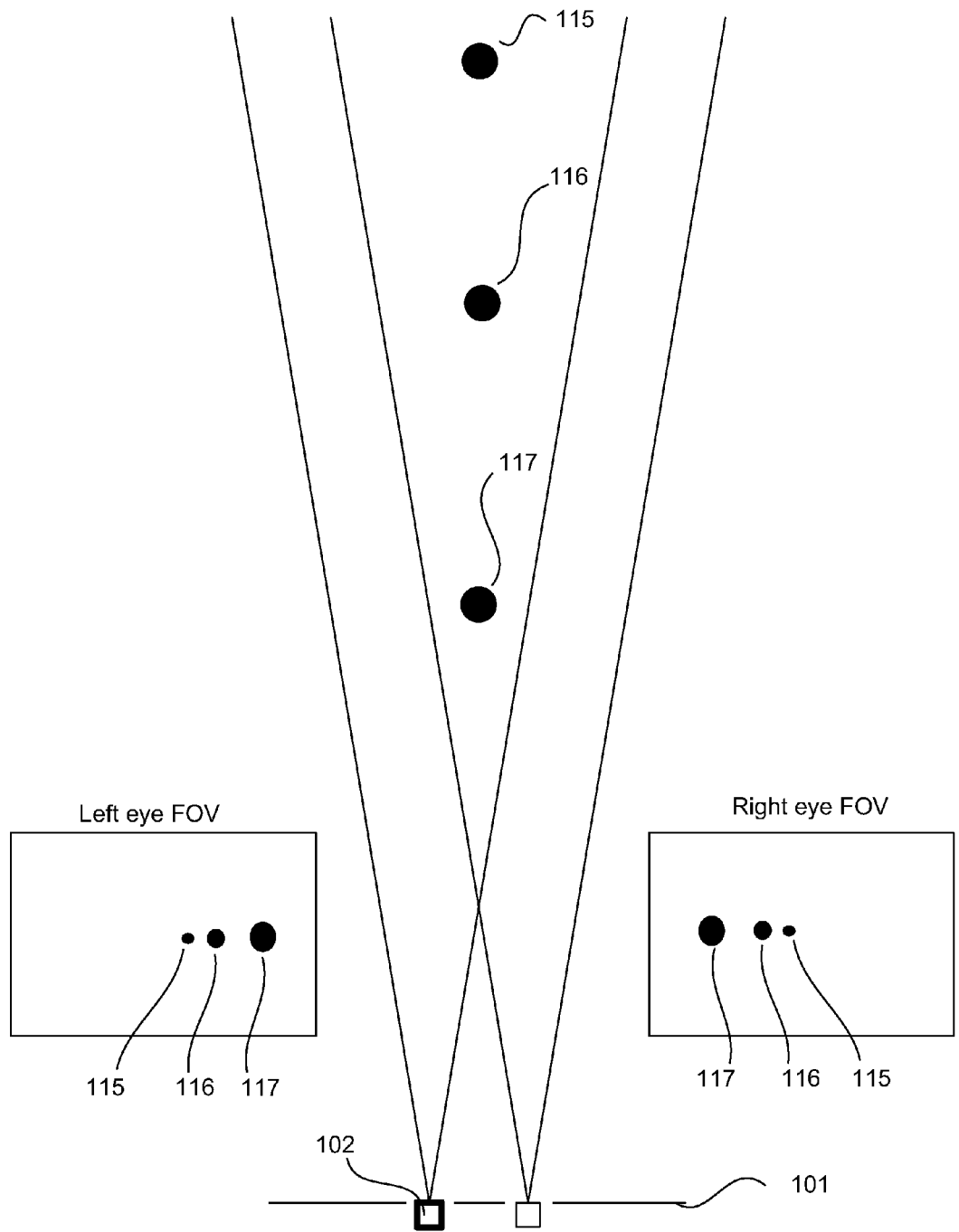

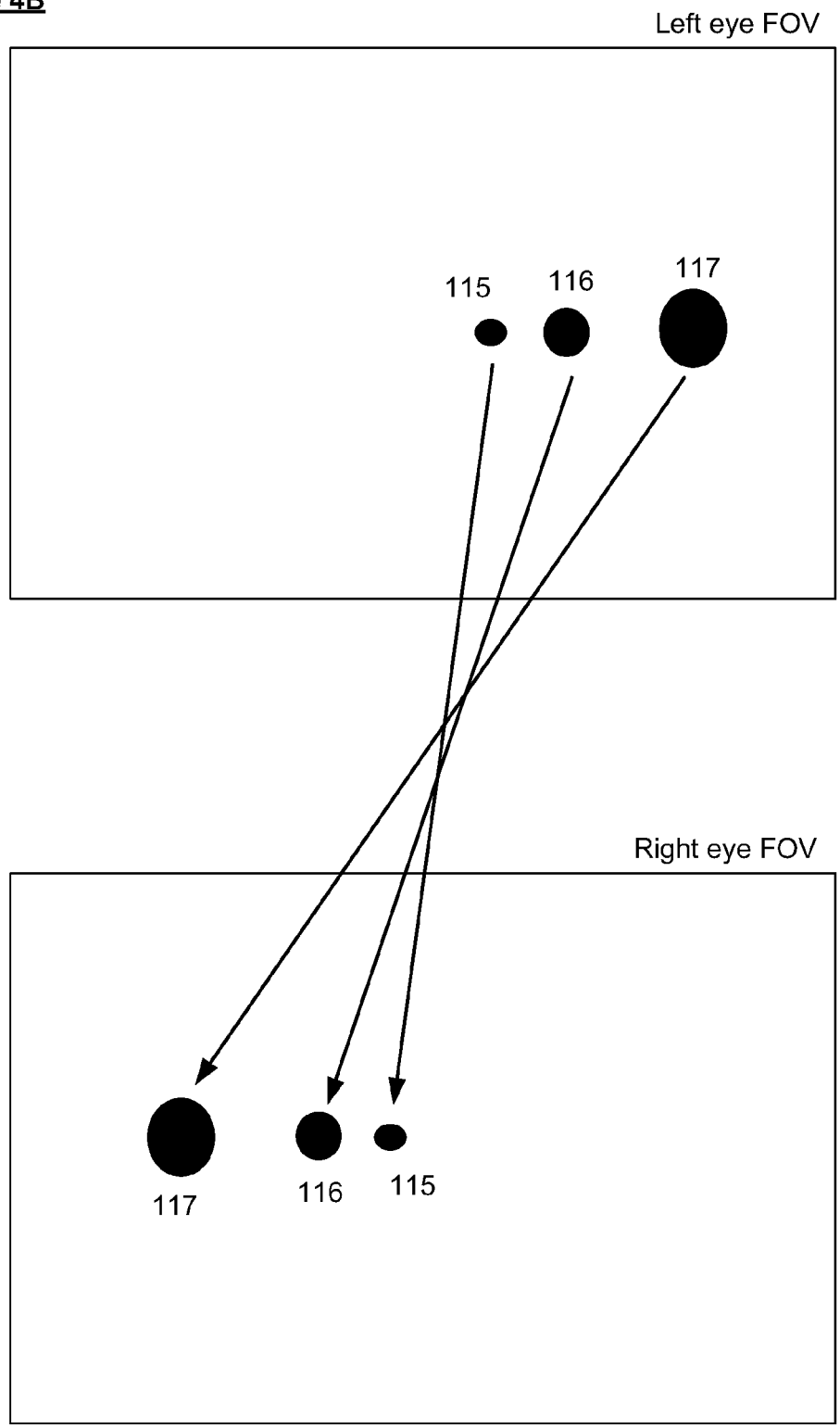

Figure 6
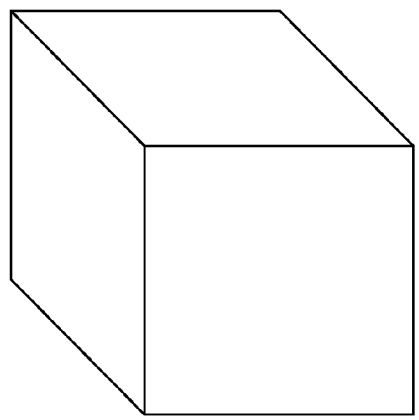
FIG. 6a
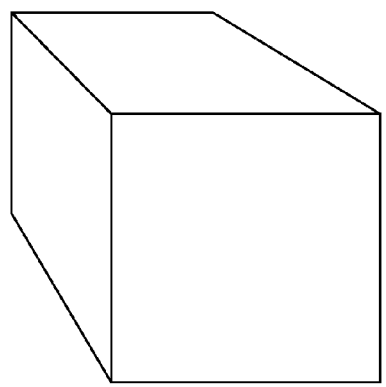
FIG. 6b
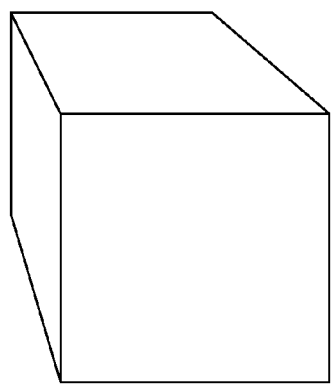
FIG. 6c

Figure 7
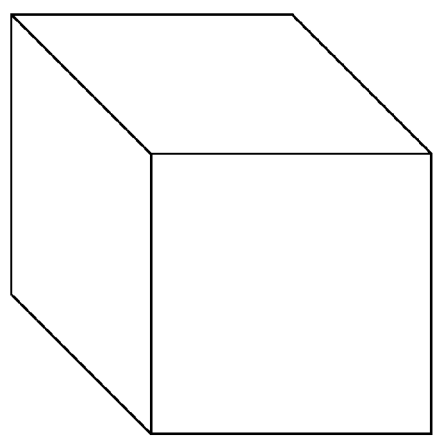
FIG. 7a
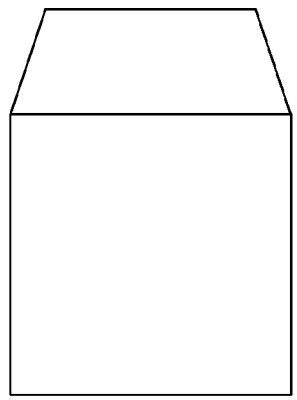
FIG. 7b
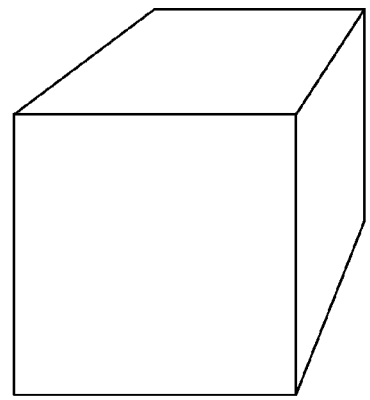
FIG. 7c

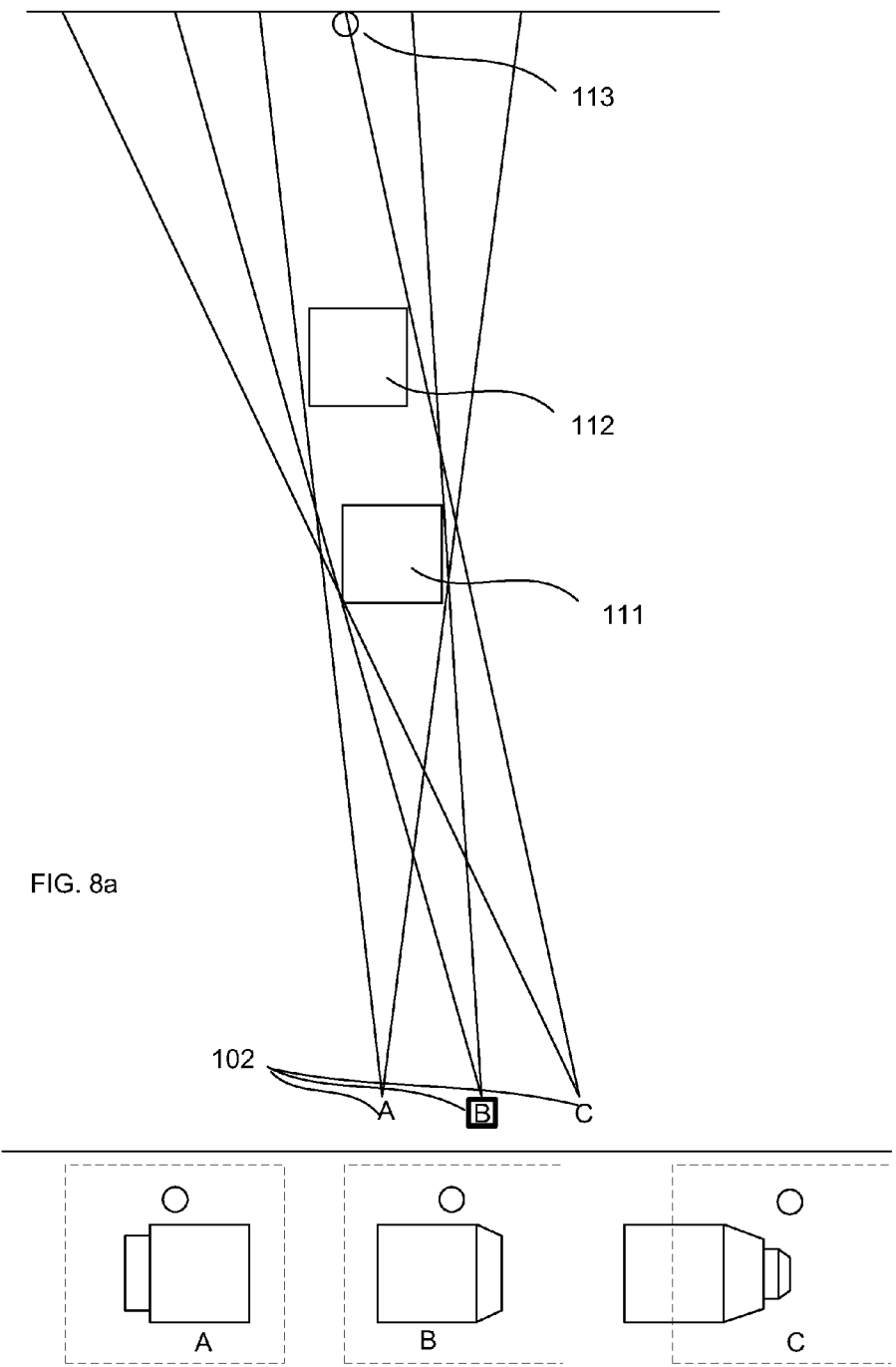

METHODS, SYSTEMS, DEVICES AND ASSOCIATED PROCESSING LOGIC FOR GENERATING STEREOSCOPIC IMAGES AND VIDEO

PRIORITY CLAIMS

This Application is a continuation in part of:

U.S. patent application Ser. No. 11/572,958, titled "SYSTEM AND METHOD FOR 3D SPACE-DIMENSION BASED IMAGE PROCESSING" (hereinafter "'958 Application"), filed in the USPTO by the inventors of the present application on May 1, 2007, which claims priority from PCT/IL2005/000813 filed Jul. 31, 2005 and which in turn claims priority from 60/592,136 filed Jul. 30, 2004, all of which are hereby incorporated by reference into the present description in their entirety.

This Application is a continuation in part of:

U.S. patent application Ser. No. 12/517,210, titled "APPARATUS SYSTEM AND METHOD FOR HUMAN MACHINE INTERFACE" (hereinafter "'210 Application"), filed in the USPTO by the inventors of the present application on Jun. 2, 2009, which claims priority from PCT/IL2007/000475 filed Apr. 15, 2007, each of which are hereby incorporated by reference into the present description in its entirety.

This application further claims priority from:

U.S. Provisional Patent Application No. 61/435,311, titled "2-D to 3-D Conversion", filed in the USPTO by the inventors of the present application on Jan. 23, 2011, which is hereby incorporated by reference into the present description in its entirety.

FIELD OF THE INVENTION

The present invention generally relates to the field of image processing. More specifically, the present invention relates to methods, systems, devices and associated processing logic for generating stereoscopic 3-dimensional images and video.

BACKGROUND

Conventional 3D-stereoscopic photography typically employs twin cameras having parallel optical axes and a fixed distance between their aligned lenses. These twin cameras generally produce a pair of images which images can be displayed by any of the known in the art techniques for stereoscopic displaying and viewing. These techniques are based, in general, on the principle that the image taken by a right lens is displayed to the right eye of a viewer and the image taken by the left lens is displayed to the left eye of the viewer.

For example, U.S. Pat. No. 6,906,687, assigned to Texas Instruments Incorporated, entitled "Digital formatter for 3-dimensional display applications" discloses a 3D digital projection display that uses a quadruple memory buffer to store and read processed video data for both right-eye and left-eye display. With this formatter video data is processed at a 48-frame/sec rate and readout twice (repeated) to provide a flash rate of 96 (up to 120) frames/sec, which is above the display flicker threshold. The data is then synchronized with a headset or goggles with the right-eye and left-eye frames being precisely out-of-phase to produce a perceived 3-D image.

Stereoscopic motion pictures can be produced through a variety of different methods. Though anaglyph was sometimes used prior to 1948, during the early "Golden Era" of 3-D cinematography of the 1950s the polarization system was used for most feature length movies in the United States. In the 21st century, polarization 3-D systems have continued to dominate the scene, although during the 60s and 70s some classic films were converted to anaglyph for theaters not equipped for polarization, and were even shown in 3-D on TV. In the years following the mid 80s, some movies were made with short segments in anaglyph 3D. The following are some of the technical details and methodologies employed in some of the more notable 3-D movie systems that have been developed.

Anaglyph

Anaglyph images were the earliest method of presenting theatrical 3-D and the one most commonly associated with stereoscopy by the public at large, mostly because of non-theatrical 3D media such as comic books and 3D TV broadcasts, where polarization is not practical. They were made popular because of the ease of their production and exhibition. The first anaglyph movie was invented in 1915. Though the earliest theatrical presentations were done with this system, most 3D movies from the 50s and 80s were originally shown polarized.

In an anaglyph, the two images are superimposed in an additive light setting through two filters, one red and one cyan. In a subtractive light setting, the two images are printed in the same complementary colors on white paper. Glasses with colored filters in each eye separate the appropriate images by canceling the filter color out and rendering the complementary color black.

Anaglyph images are much easier to view than either parallel sighting or cross-eyed stereograms, although the latter types offer bright and accurate color rendering, particularly in the red component, which is muted, or desaturated with even the best color anaglyphs. A compensating technique, commonly known as Anachrome, uses a slightly more transparent cyan filter in the patented glasses associated with the technique. Process reconfigures the typical anaglyph image to have less parallax.

An alternative to the usual red and cyan filter system of anaglyph is ColorCode 3-D; a patented anaglyph system which was invented in order to present an anaglyph image in conjunction with the NTSC television standard, in which the red channel is often compromised. ColorCode uses the complementary colors of yellow and dark blue on-screen, and the colors of the glasses' lenses are amber and dark blue.

The anaglyph 3-D system was the earliest system used in theatrical presentations and requires less specialized hardware.

Anaglyph is also used in printed materials and in 3D TV broadcasts where polarization is not practical. 3D polarized TVs and other displays only became available from several manufacturers in 2008; these generate polarization on the receiving end.

Polarization Systems

The polarization 3-D system has been the standard for theatrical presentations since it was used for Bwana Devil in 1952, though early Imax presentations were done using the eclipse system and in the 60s and 70s classic 3D movies were sometimes converted to anaglyph for special presentations. The polarization system has better color fidelity and less ghosting than the anaglyph system.

To present a stereoscopic motion picture, two images are projected superimposed onto the same screen through different polarizing filters. The viewer wears low-cost eyeglasses which also contain a pair of polarizing filters oriented differently (clockwise/counterclockwise with circular polarization or at 90 degree angles, usually 45 and 135 degrees, with linear polarization). As each filter passes only that light which is similarly polarized and blocks the light polarized differently, each eye sees a different image. This is used to produce a three-dimensional effect by projecting the same scene into both eyes, but depicted from slightly different perspectives. Since no head tracking is involved, the entire audience can view the stereoscopic images at the same time. Additionally, since both lenses have the same color, people with one dominant eye (amblyopia), where one eye is used more, are able to see the 3D effect, previously negated by the separation of the two colors.

In the case of RealD a circularly polarizing liquid crystal filter which can switch polarity 144 times per second is placed in front of the projector lens. Only one projector is needed, as the left and right eye images are displayed alternately. Sony features a new system called RealD XLS, which shows both circular polarized images simultaneously: a single 4K projector (4096×2160 resolution) displays both 2K images (2048×858 resolution) on top of each other at the same time, a special lens attachment polarizes and projects the images.

Thomson Technicolor has produced a system using a split lens which allows traditional 35 mm projectors to be adapted to project in 3D using over/under 35 mm film. This is a very cost-effective way to convert a screen as all that is needed is the lens and metallic (silver) screen rather than converting entirely to digital. A metallic screen is necessary for these systems as reflection from non-metallic surfaces destroy the polarization of the light.

Polarized stereoscopic pictures have been around since 1936, when Edwin H. Land first applied it to motion pictures. The so called "3-D movie craze" in the years 1952 through 1955 was almost entirely offered in theaters using linear polarizing projection and glasses. Only a minute amount of the total 3D films shown in the period used the anaglyph color filter method. Linear polarization was likewise used with consumer level stereo projectors. Polarization was also used during the 3D revival of the 80s.

In the 2000s, computer animation, competition from DVDs and other media, digital projection, and the use of sophisticated IMAX 70 mm film projectors, have created an opportunity for a new wave of polarized 3D films.

Eclipse Method

With the eclipse method, a shutter blocks light from each appropriate eye when the converse eye's image is projected on the screen. The projector alternates between left and right images, and opens and closes the shutters in the glasses or viewer in synchronization with the images on the screen. This was the basis of the Teleview system which was used briefly in 1922.

A variation on the eclipse method is used in LCD shutter glasses. Glasses containing liquid crystal that will let light through in synchronization with the images on the cinema, TV or computer screen, using the concept of alternate-frame sequencing. This is the method used by nVidia, XpanD 3D, and earlier IMAX systems. A drawback of this method is the need for each person viewing to wear expensive, electronic glasses that must be synchronized with the display system using a wireless signal or attached wire. The shutterglasses are heavier than most polarized glasses though lighter models are no heavier than some sunglasses or deluxe polarized glasses. These systems, however, do not require a silver screen for projected images.

Interference Filter Technology

Dolby 3D uses specific wavelengths of red, green, and blue for the right eye, and different wavelengths of red, green, and blue for the left eye. Eyeglasses which filter out the very specific wavelengths allow the wearer to see a 3D image. This technology eliminates the expensive silver screens required for polarized systems such as RealD, which is the most common 3D display system in theaters. It does, however, require much more expensive glasses than the polarized systems. It is also known as spectral comb filtering or wavelength multiplex visualization The recently introduced Panavision 3D system also uses this technology, though with a wider spectrum and more "teeth" to the "comb" (5 for each eye in the Panavision system). Panavision also claim that their glasses are cheaper to manufacture than those used by Dolby.

Pulfrich

The Pulfrich effect is based on the phenomenon of the human eye processing images more slowly when there is less light, as when looking through a dark lens.

Imagine a camera which starts at position X and moves right to position Y. If a viewer watches this segment with a dark lens over the left eye, then when the right eye sees the image recorded when the camera is at Y, the left eye will be a few milliseconds behind and will still be seeing the image recorded at X, thus creating the necessary parallax to generate right and left eye views and 3D perception, much the same as when still pictures are generated by shifting a single camera. The intensity of this effect will depend on how fast the camera is moving relative to the distance to the objects; greater speed creates greater parallax. A similar effect can be achieved by using a stationary camera and continuously rotating an otherwise stationary object. If the movement stops, the eye looking through the dark lens (which could be either eye depending on the direction the camera is moving) will "catch up" and the effect will disappear. One advantage of this system is that people not wearing the glasses will see a perfectly normal picture.

Of course, incidental movement of objects will create spurious artifacts, and these incidental effects will be seen as artificial depth not related to actual depth in the scene. Unfortunately, many of the applications of Pulfrich involve deliberately causing just this sort of effect and this has given the technique a bad reputation. When the only movement is lateral movement of the camera then the effect is as real as any other form of stereoscopy, but this seldom happens except in highly contrived situations.

Though Pulfrich has been used often on TV and in computer games, it is rarely if ever used in theatrical presentations.

Spectral Separation

ChromaDepth uses a holographic film in the glasses that creates an effect like a dispersive prism. This causes redder objects to be perceived as near and bluer objects as farther away.

Lenticular or Barrier Screens

Lenticular printing and parallax barrier technologies involve imposing two (or more) images on the same sheet, in narrow, alternating strips, and using a screen that either blocks one of the two images' strips (in the case of parallax barriers) or uses equally narrow lenses to bend the strips of image and make it appear to fill the entire image (in the case of lenticular prints). To produce the stereoscopic effect, the person must be positioned so that one eye sees one of the two images and the other sees the other. In this method, glasses are not necessary to see the stereoscopic image.

Both images are projected onto a high-gain, corrugated screen which reflects light at acute angles. In order to see the stereoscopic image, the viewer must sit within a very narrow angle that is nearly perpendicular to the screen, limiting the size of the audience. Lenticular was used for theatrical presentation of numerous shorts in Russia from 1940-1948 and in 1954 for the feature length films Crystal, Machine 22-12 and The Pencil on Ice.

Though its use in theatrical presentations has been rather limited, lenticular has been widely used for a variety of novelty items and has even been used in amateur 3D photography.

All the above described methods share a common drawback—they all require stereoscopic photography. This means that only images originally photographed/filmed with specialized equipment may be viewed in 3D. It would therefore be desirable to create stereoscopic images/video from conventional images/videos photographed/filmed using conventional (e.g. single aperture) photographic equipment.

SUMMARY OF THE INVENTION

The present invention includes methods, systems, devices and associated processing logic for generating stereoscopic 3-dimensional images and/or video from 2-Dimensional images or video. According to some embodiments of the present invention, there may be provided a stereoscopic 3D generating system which may be adapted to extrapolate and render 2D complementary images and or video from a first 2D image and/or video, which complementary images and/or video, when combined with the first image or video, or a second complementary image or video, create a stereoscopic image of the scene captured in the first image or video. The stereoscopic 3D generation system may generate a complementary image or images, such that when a viewer views the first image or a second complementary image (shifted in the other direction from the first complementary image) with one eye and the complementary image with the other eye, a perception or illusion of depth in the image is created (e.g. a stereoscopic 3D image). Two complimentary image frames may comprise a single stereoscopic frame.

According to further embodiments of the present invention, a stereoscopic 3D generation system may be further adapted to extrapolate and render a series of 2D complementary images from a first series of 2D images (a video), which series of complementary images, when combined with the first series of images, create a series of stereoscopic images of the scenes captured in the first series of images. The 3D generation system may generate a series of complementary images, such that when a viewer views the first series of images with one eye and the series of complementary images with the other eye, an illusion of depth in the series of images is created (e.g. a stereoscopic 3D movie/video).

According to some embodiments of the present invention, a method for generating a stereoscopic image may comprise: (1) receiving a first 2-dimensional (2D) image data set representing a 2D image of a scene; (2) identifying a first non-rigid object within the first 2D image data set; (3) correlating a 3-Dimensional skeletal model with the first non-rigid object; (4) determining depth data relating to the first non-rigid object based at least partially on the correlated skeletal model; (5) calculating, based on the determined depth data relating to the first non-rigid object, a shift of a position, within the scene, of the first non-rigid object, which shift corresponds to a second viewing eye position and angle of the scene; (6) creating a complementary 2D image data set depicting the scene from a second eye viewing position and angle, wherein said creating comprises shifting the position of the first non-rigid object, within the scene, according to the calculated shift; and (7) modifying, based at least partially on the first 3D skeletal model, the appearance of the first non-rigid object, such as to represent the appearance of the first non-rigid object from a second viewing angle and/or modifying the appearance of a rigid object within the first image data set to correspond to a second viewing angle by copying the texture of one or more pixels along the edge of the rigid object, to neighboring pixels.

According to further embodiments, the system may be adapted to identify a rigid object within the first 2D image set and estimate a depth of the rigid object based on a spatial relationship between the rigid object and the first non-rigid object. A stereoscopic image of the scene may be generated by combining the complementary 2D image data set with the first 2D image set. Optionally, a first image data set may be used to generate two separate complimentary image data sets which when combined (presented together) form a stereoscopic image of the scene. Both a first complementary 2D image data set and a second complementary 2D image set may be generated using the above recited method for the first 2D image data set.

Optionally, the system and method may be applied to a series of images, which series of images may comprise a video sequence.

Optionally said method may be performed in real time.

According to further embodiments of the present invention, a system for generating a stereoscopic image may be provided comprising: (1) a receiving module for receiving a first 2-dimensional (2D) image data set representing a 2D image of a scene; (2) a discrete object identifying module functionally associated with the receiving module for identifying a first non-rigid object within the first 2D image data set; (3) a reference model correlator functionally associated with the identifying module for correlating a 3-Dimensional skeletal model with the first non-rigid object; (4) an object depth estimating module for determining depth data relating to the first non-rigid object based at least partially on the correlated skeletal model; (5) a horizontal shift calculator for calculating, based on the determined depth data relating to the first non-rigid object, a shift of a position, within the scene, of the first non-rigid object, which shift corresponds to a second viewing angle of the scene; and (6) a modified angle of view generator for modifying, based at least partially on the first 3D skeletal model, the appearance of the first non-rigid object, such as to represent the appearance of the first non-rigid object from a second viewing angle and/or for modifying the appearance of a rigid object within the first image data set to correspond to a second viewing angle, by copying the texture of one or more pixels along the edge of the rigid object, to neighboring pixels. There may also be provided a rendering module for creating a complementary 2D image data set depicting the scene from a second eye viewing position and angle, wherein creating comprises shifting the position of the first non-rigid object, within the scene, according to the calculated shift.

According to further embodiments of the present invention, A method of generating a stereoscopic image from a conventional two dimensional (2D) image dataset may be provided, said method comprising: (1) Identifying one or more discrete objects within the two dimensional image dataset; (2) for at least one identified object selecting a reference model (which may be a 2D or 3D model) including at least one parameter characterizing at least one visible characteristic of the identified object; (3) estimating a depth of the identified object within the two dimensional image by comparing an appearance of the at least one visible characteristic of the identified object within the image to the selected reference model; and (4) calculating, based on the estimated depth, a horizontal shift between instances of the identified object within each a pair of complimenting image frames of a stereoscopic image frame being generated.

According to further embodiments, selecting a reference model may include consideration of metadata relating to the 2D image and/or selecting a reference model for a second identified object at least partially based on said reference model selection already performed.

According to further embodiments, the 3D model may be a skeletal model including spatial constraints between elements of the model and said estimating of depth may be at least partially based on the skeletal model constraints.

According to embodiments, estimating depth information, absolute and/or relative, of at least a portion of a non-rigid object, such as a human body, may be performed using a structure identifier for identifying non-rigid structures of the non-rigid human body within an acquired 2D image data set. A skeleton model insertion unit may be adapted to associate elements of a three-dimensional skeleton model elements with corresponding structures identified structures within the acquired 2D image, and may further be adapted to approximate depth information of at least one structure of the human body in the 2D image by imposing constraints onto the three-dimensional skeleton model such that model defined spatial constrains between skeleton model elements and spatial relations between identified non-rigid human body structures in the acquired 2D image data set are used to fit the model to the 2D image data set and to approximate 3D coordinates of at least one of said non-rigid structures of the non-rigid body.

Estimating depth or positional data of a human subject from a 2-Dimensional image may include receiving 2-dimensional image data associated with an acquired image, which image captures at least a portion of a human subject; computationally identifying anatomical structures of the human subject within the 2-Dimensional data; matching 3-Dimensional skeletal model elements with the identified structures within the 2-Dimensional data, wherein the skeletal model defines spatial relational constraints between two or more anatomical structures of a human body; and extrapolating positional information of at least one of the identified structures, which positional information relates to the physical position of the structure at the time the acquired image was captured, based on comparison of 2-dimensional projections of the matched skeletal model elements to positions of the identified anatomical structures within the received image data.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1: is a flowchart of an exemplary process for generating stereoscopic image/video from 2D images/video, in accordance with some embodiments of the present invention;

FIG. 2: is a block diagram of an exemplary system for generating stereoscopic image/video from 2D images/video, in accordance with some embodiments of the present invention;

FIG. 4A: is an illustration exemplifying horizontal shifts, between an image and a complementary image, of an object at different depths, showing the effect of the shifts when an object is located in the center of the view, all in accordance with some embodiments of the present invention;

FIG. 4B: is an illustration exemplifying horizontal shifts, between an image and a complementary image, of an object at different depths, showing the effect of the shifts when an object is located in the center of the view, all in accordance with some embodiments of the present invention;

FIG. 6: includes illustrations of exemplary modifications of angles of view, corresponding to an image and a complementary image of an object, all in accordance with some embodiments of the present invention;

FIG. 7: includes illustrations of exemplary modifications of angles of view, corresponding to an image and a complementary image of an object, and demonstrating the use of previously stored 3D data relating to an object, all in accordance with some embodiments of the present invention;

FIG. 8: includes illustrations of an exemplary scene, a resulting image and generated complementary images, all in accordance with some embodiments of the present invention;

Figure 3A:
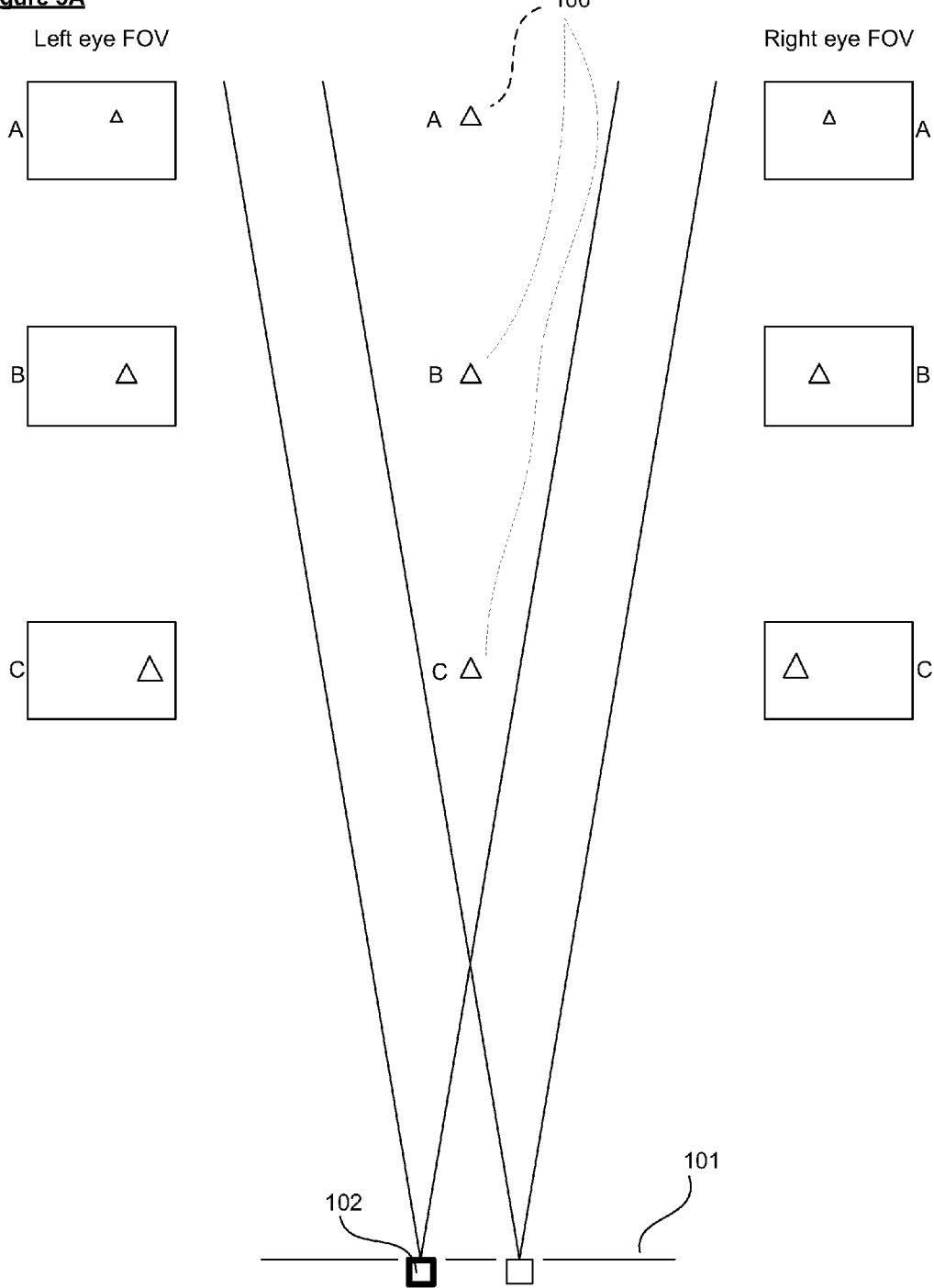
FIG. 3A: is an illustration exemplifying horizontal shifts, between an image and a complementary image, of an object at different depths, all in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

It should be understood that the accompanying drawings are presented solely to elucidate the following detailed description, are therefore, exemplary in nature and do not include all the possible permutations of the present invention.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, including mobile phones or any mobile device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. These apparatuses may be specially constructed for the desired purposes, or may comprise general purpose computers selectively activated or reconfigured by computer programs stored in the computers or phones or any other computing device. Such computer programs may be stored in computer readable storage mediums, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct more specialized apparatuses to perform the desired methods. The desired structure for a variety of these systems will appear from the description below. In addition, embodiments of the present invention are not described with reference to any particular programming language. It will be appreciated that a variety of programming languages may be used to implement the teachings of the inventions as described herein.

It should be understood that any topology, technology and/or standard for computer networking (e.g. mesh networks, infiniband connections, RDMA, etc.), known today or to be devised in the future, may be applicable to the present invention.

The present invention includes methods, systems, devices and associated processing logic for generating stereoscopic 3-dimensional images and/or video from 2-Dimensional images or video. According to some embodiments of the present invention, there may be provided a stereoscopic 3D generating system which may be adapted to extrapolate and render 2D complementary images and or video from a first 2D image and/or video, which complementary images and/or video, when combined with the first image or video, or a second complementary image or video, create a stereoscopic image of the scene captured in the first image or video. In other words, the stereoscopic 3D generation system may generate a complementary image or images, such that when a viewer views the first image or a second complementary image (shifted in the opposite direction from the first complementary image) with one eye and the complementary image with the other eye, an illusion of depth in the image is created (e.g. a stereoscopic 3D image).

According to further embodiments of the present invention, a stereoscopic 3D generation system may be further adapted to extrapolate and render a series of 2D complementary images from a first series of 2D images (a video), which series of complementary images, when combined with the first series of images, create a series of stereoscopic images of the scenes captured in the first series of images. In other words, the 3D generation system may generate a series of complementary images, such that when a viewer views the first series of images with one eye and the series of complementary images with the other eye, an illusion of depth in the series of images is created (e.g. a stereoscopic 3D movie/video).

Figure 5:
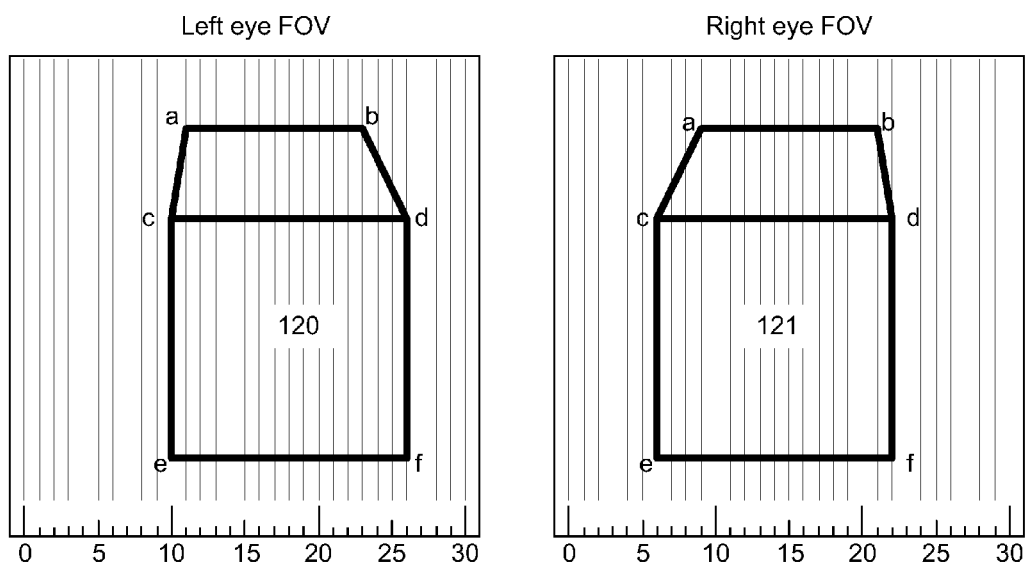
FIG. 5: is an illustration exemplifying horizontal shifts of different elements of an object, located at different depths, between an image and a complementary image, all in accordance with some embodiments of the present invention.
Figure 9A:
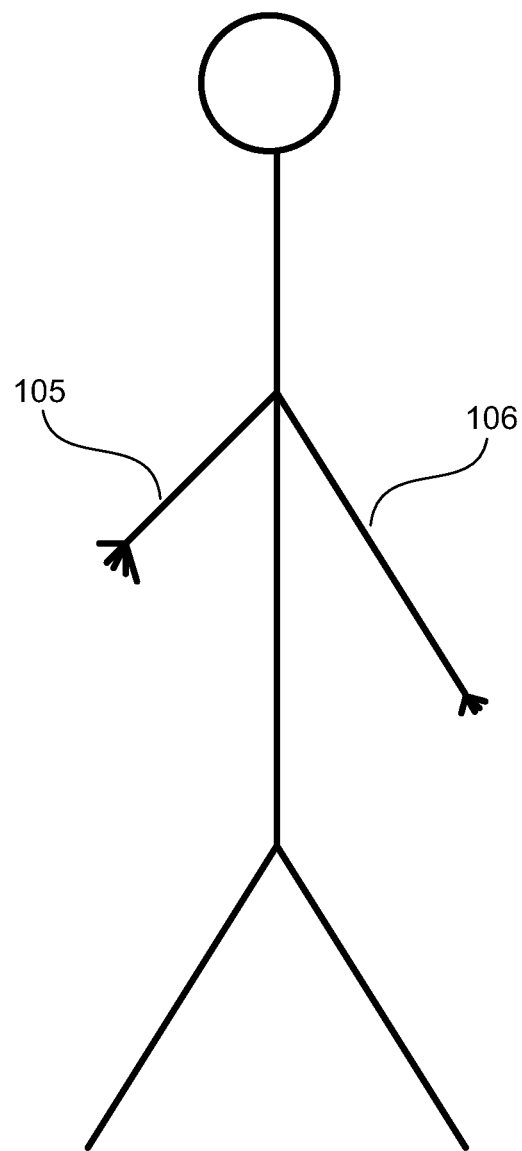
FIG. 9A: is an exemplary 2D image of a human, in accordance with some embodiments of the present invention.
Figure 9B:
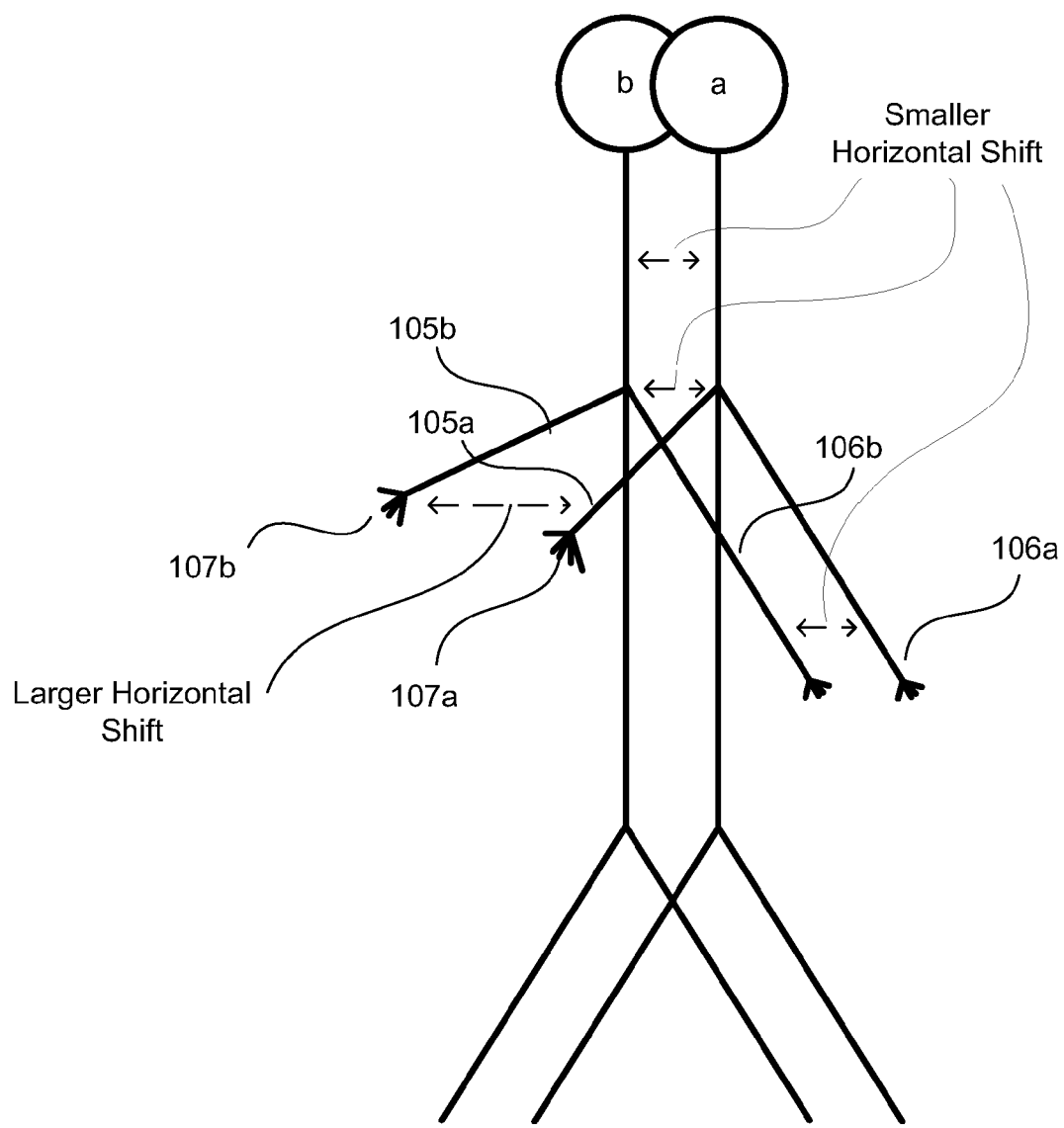
FIG. 9B: is an exemplary 2D image of a human aside an exemplary complementary image of the human, all in accordance with some embodiments of the present invention.

According to some embodiments of the present invention, the process of generating a stereoscopic 3D image (shown in FIG. 1) may be comprised of:

a. Receiving a first 2D image data set to be converted to a stereoscopic 3D image;

b. Identifying one or more discrete objects within the 2D image data set;

c. Characterizing the identified objects. Characterizing the objects may be a multi layered process, in which objects are first sub-characterized as rigid or non-rigid objects and/or stationary/moving objects, Human/non-human etc. and then further characterized within the sub-groups based on any visible characteristic of the identified objects. Furthermore, characterization of one object may be influenced and/or assisted by the characterization of another object within the same image (e.g. an object may be characterized as a chair if it appears by an already characterized table, or a round object appearing above an object characterized as a human torso may be characterized as a head partially based on the torso characterization, or an object may be characterized as a car if it appears in an image in which a traffic light has been characterized, etc.). According to further embodiments, characterization may be further based on reference models stored in associated database and/or provided by an exterior source by correlating object parameters/characteristics to model parameters. This process is discussed in detail in the '958 Application of which this application is a continuation in part and all relevant descriptions described therein may be relevant to this process and are hereby incorporated herein;

d. Correlating the characterized objects and/or object elements with reference models where possible. According to some embodiments reference models may be 2D models or may be 3D models (including but not limited to skeletal models as described in the '958 Application). According to further embodiments, for this purpose cloud based object recognition may be implemented (i.e. exterior databases and object recognition and modeling resources may be accessed via an appropriate data network);

e. Inserting the correlated reference models into the objects identified within the Image data set, based on the physical characteristics of the identified objects within the image data set. This process may include distortion, translation and scaling of the correlated reference models. This process is discussed in detail in the '958 Application of which this application is a continuation in part and all relevant descriptions described therein may be relevant to this process, including the necessary modifications, and are hereby incorporated herein;

f. Extrapolating and/or Estimating depth information relating to the identified objects and elements of objects in relation to the imaging device which captured the first image, in relation to a desired viewpoint and/or in relation to each other. Alternatively and/or in parallel, the distance of each and/or a portion of the pixels within the image from the imaging device which captured the first image and/or in relation to each other may be determined. According to some embodiments, this process may be performed separately for objects correlated to referenced models (modeled objects) and objects not correlated to reference models (non-modeled objects):

i. Modeled objects—according to some embodiments, depth information relating to modeled objects and object elements may be extrapolated based on a relationship between the spatial characteristics of the object in the image data set and a known parameter of the modeled object (e.g. if the modeled object is a '54 mustang, the distance between the imaging device and the object may be determined based on the ratio between the size of the tire of the mustang in the image and the known size of a tire of a '54 mustang—similarly distances may be estimated in less specific cases as the size of most tires of cars is similar, allowing such an estimation to be relevant to any recognized car). According to further embodiments, depth information may be extrapolated for non-rigid objects (e.g. a human) as described in detail in the '958 Application of which this application is a continuation in part and all relevant descriptions described therein may be relevant to this process and are hereby incorporated herein. Further, depth information may be estimated for an object based on the spatial relationship between the object and another object for which depth information has already been determined (e.g. if a man sits on a chair within an image, depth data relating to the chair may be similar to the depth data relating to the sitting man). According to yet further embodiments, depth information relating to an object may be determined based on the depth information relating to the same object in a previous image of a series (e.g. in a video sequence). Furthermore, depth information relating to an object may be determined based on the spatial location of the object throughout a series of images (e.g. if the imaging device has been determined to have moved a known distance between the images, or another object within the image has moved a known distance simple triangulation may be used to determine the depth of the object). It should be understood that any combination of the above described methods may be used and/or an iterative process of the above methods may be used. According to some embodiments, separate depth information may be extrapolated for different elements of a modeled object based on the appearance of the element within the image and/or its relation to the appearance of other elements of the same object and/or its relation to other objects in the image (e.g. a human hand may be determined to be closer to the imaging device than the torso—as shown in FIGS. 9A & 9B, one table leg may be determined to be closer than another, one side of a cube may be closer than another—as shown in FIG. 5 etc.).

ii. Non-modeled objects—in addition to any of the above mentioned methods, according to some embodiments of the present invention, determining distances of non-modeled objects may comprise estimating distances of these objects based on their spatial relationships to modeled objects and/or based on their position and/or change of position throughout a series of images (e.g. if camera location and/or position has changed during the capture of the multiple images, an appropriate calculation of depth of stationary objects can easily be performed, similarly if a non-stationary object for which depth information is available, has moved throughout a series of images, stationary objects depth can be estimated based on the change in spatial relationship between the stationary object and the object for which depth information is available).

g. Calculating a horizontal shift to the right* for each object/object-element/pixel, based on the determined distance from the imaging-device/desired-viewpoint of the object/object-element/pixel in the first image and epipolar geometry. In other words, a horizontal shift may be calculated for each object/object-element/pixel, which shift is necessary in order to achieve a second viewpoint, corresponding to the view that would be viewed from the left eye if the original image was viewed from the right eye. i.e. a horizontal shift of the object corresponding to the visible horizontal shift in the image plane that would occur to the object if the imaging device had been moved from the position of the right eye to the position of the left eye when capturing the image (in the case where one complementary image is created to be combined with the original image)—obviously on the basis of basic geometry, this shift is dependent on the distance of the object from the imaging device (the farther the object the smaller the shift and vice versa). Alternatively, if two complementary images are to be combined, one for the left eye and one for the right, the shift may be from the center to the left eye for one and from the center to the right eye for the second;

* throughout the current disclosure reference is made to a shift to the right of objects, object elements and/or pixels to be performed in order to achieve a view to be displayed to the left eye of a viewer. It should be understood that the reference to a shift to the right is chosen arbitrarily for convenience and clarity of the text and may alternatively be performed as a shift to the left in order to achieve a view to be displayed to the right eye of a viewer. Accordingly, any reference within this reference to a shift to the right should be considered to also refer to a shift to the left including the appropriate modifications of the description. Furthermore, throughout this disclosure, reference is made to a generated complementary image to be displayed to one eye while the original image is displayed to the other eye in order to create stereoscopic vision. It should be understood that two complementary images, shifted in opposite directions from the original image (one for the right eye and one for the left) may equally be used to generate stereoscopic images and all descriptions herein should be understood to include this option, including the necessary modifications.

Figure 3B:
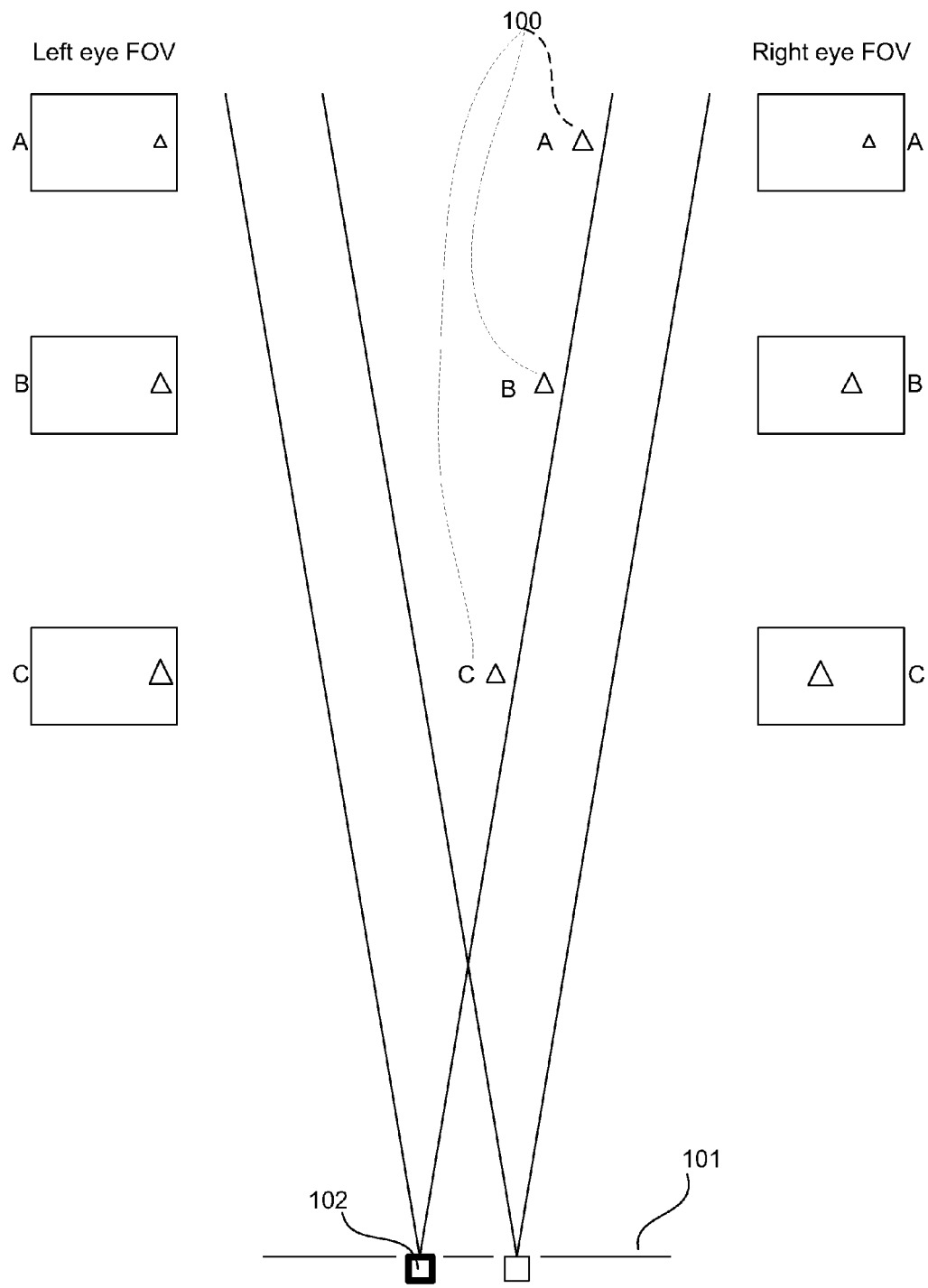
FIG. 3B: is an illustration exemplifying horizontal shifts, between an image and a complementary image, of an object at different depths, all in accordance with some embodiments of the present invention.

FIGS. 3A and 3B illustrate the above discussed horizontal shift. These figures show two examples of an object (100) at three different depths (A, B and C) in the field-of-view (FOV) of the left eye and the right eye. The 3 cases represent three different distances of the object (100) from the viewer plane (101). In both examples, the closer the objects presentations are to each other within the fields-of-view of both eyes (i.e. the smaller the horizontal shift of the object between the images presented to each eye), the further the object appears to be from the viewer's plane (101). Conversely, the further the objects presentations are from each other within the fields-of-view of both eyes, the closer the object appears to be to the viewer's plane (101). If the object is at the same place in the fields-of-view of both the left and right eyes, the object appears to be seen at infinity. The farther left the object is presented in the field-of-view of the right eye, relative to the presentation of the object in the field-of-view of the left eye, the closer to the viewer plane it appears to be.

From FIGS. 3A and 3B it can also be noticed that the further the object is from the camera, the smaller its appearance in the field-of-view may be, and the closer the object is to the camera, the larger its appearance may be in the field-of-view. For instance, in FIG. 3A object (100) in location A may appear smaller in the fields-of-view of both eyes than the same object in location C which is closer to the camera (102) than location A. The image of the object in location A is near the center of the field-of-view of the left eye and the right eye which makes the object appear to be far away. The object in location C is near the right edge of the field-of-view of the left eye and near the left edge of the field-of-view of the right eye which makes the object appear to be close to the viewer.

FIGS. 4A and 4B demonstrate the effect a horizontal shift may have regarding objects located directly in front of the imaging device (i.e. within the area between the eyes). Such objects, as illustrated in FIG. 4B may appear in reverse (mirroring) order in the complementary image as a result of the applied horizontal shift.

A further example of the calculation of a horizontal shift, in relation to elements of an object located at different depths, is illustrated in FIG. 5. In this example there is an object (120) which is captured by a camera and its 2D image is displayed to the left eye. Object elements a, b, c, d, e, f of the object (120) are identified and their depth estimated such that object elements 'c', 'd', 'e', 'f' are determined to be closer to the camera, and object elements 'a' and 'b' to be further away from the camera. Accordingly, a shift to the left for each of the object elements is calculated—a shift of 2 is calculated for object elements 'a' and 'b' which are farther away from the camera (a shift from x=23 to x=21 is calculated for object element 'b', and from x=11 to x=9 is calculated for object element 'a'). A shift of 4 is calculated for object elements 'c', 'd', 'e' and 'f' which are closer to the camera (object elements 'd' and 'f' are shifted from x=26 to x=22, and object elements 'c' and 'e' are shifted from x=10 to x=6). The result renders a shifted image (121) to be displayed to the right eye.

h. Calculating a modification of the angle of view (AOV) which may be applied to each object/object-element. This modification may be based on the position of the object/object-element within the first 2D image and the determined distance of each object and/or object element from: (1) the imaging device which captured the first image, (2) a desired (virtual) viewing point and/or (3) in relation to each other. In other words, based on the depth of each object from the desired viewing point, calculating the modification of the angle from which the object would be viewed if the imaging device had been moved from the position of the right eye to the position of the left eye (the virtual viewing point) when capturing the image (in the case where one complementary image is created to be combined with the original image). Alternatively, if two complementary images are to be combined, one for the left eye and one for the right, the shift would be from the center to the left eye for one and from the center to the right eye for the second. Obviously, on the basis of basic geometry, this modification is dependent on the distance of the object from the imaging device (the farther the object the smaller the modification and vice versa) and on its position within the frame. FIGS. 5 and 6 illustrate exemplary modified AOV's of objects;

i. Generating the modified AOV for each object. According to some embodiments, for modeled objects which have been correlated to 3D reference models, a modified AOV (a virtual viewpoint) may be generated based on the matched 3D model of each object/object element and an appropriate 2D projection of the model (a view of the object/object element) from the desired angle (i.e. from the virtual viewpoint). This process is discussed in detail in the '958 Application of which this application is a continuation in part and all relevant descriptions described therein may be relevant to this process and are hereby incorporated herein. According to some embodiments of the present invention, 3D data relating to objects may be constructed from the objects captured from multiple angels in multiple spatiotemporal frames and stored in memory. The 3D data may then be used to complement object elements which were hidden from the camera in the 2D first image and which should be revealed in the 2D complementary image. In other words, data from one image, relating to a portion of an object not viewed in a second image, may be used to construct a modified AOV of the second image when this data is needed**.

FIGS. 6-7 show exemplary modifications of AOV and their generation based on some embodiments of the present invention. FIG. 6a shows a model of a cubic object which was captured from different angles and stored in memory. FIG. 6b shows the captured cubic object. The system may display the captured image to the field of view of the left eye. FIG. 6c shows a modified AOV which may be suitable for the field of view of the right eye.

FIG. 7 shows an exemplary illustration of a 2D complementary image generation from an object image stored in the system memory.

FIG. 7a shows an example of a 3D data set of an object which is stored in memory. The object's 3D data may be gathered by the system during multiple spatiotemporal video frames which may capture images of the object from multiple angels as the object and/or the camera move in relation to each other. FIG. 7b shows an image of the object described in FIG. 7a as was taken by the camera, this image may be displayed to the field-of-view of the left eye. Since 3D data of the object is stored in the system's memory, a 2D image of the object may be rendered from any given angle of view. FIG. 7c shows the rendered image of the object of FIG. 7a from a shifted angle relative to the image of FIG. 7b. The rendered image may be displayed to the field-of-view of the right eye to create a stereoscopic 3D image of the object. According to further embodiments, generating a modified angle of view of an object may comprise copying or "stretching" pixels/texture of the edges of an object to create an illusion of a different angle of view of the object, i.e. when data regarding portions of the object which would be visible in the modified AOV is not available, this data may be replaced with the texture from the closest visible edge of the object. In other words, for objects for which 3D data is not available, the generation of a modified AOV may be performed based on an estimation of the modified AOV involving basic geometric calculations of the shape of the modified AOV wherein texture for the "newly revealed" portions is copied from the apparent portions;

j. Generating complementary 2D image data representing the scene captured in the first 2D image, in which: (1) each object/object-element/pixel is shifted to the right* from its position in the first 2D image based on the shift calculated for each object/object-element/pixel and (2) the modified view generated of each object/object element is presented;

FIG. 8 illustrates an exemplary generation of complementary 2D image data according to some embodiments of the present invention. FIG. 8a illustrates an exemplary scene including objects 111, 112 & 113 located at different depths. 102 A, B & C represent three different viewing angles of the scene, wherein 102B represents the point from which the image was originally captured and 102A & 102C represent shifted viewing angles of the left or right eye (respectively). FIG. 8b illustrates the generated complementary images, wherein B illustrates the original captured image, A illustrates a complementary image for the left eye and C illustrates a complementary image for the right eye. As can be seen, the appearances of objects 111, 112 & 113 have been horizontally shifted based on their relative depth and their AOV has been modified accordingly (shifts and modification of AOV have been exaggerated for demonstrative purposes).

k. Rendering the generated complementary 2D image data; and l. Combining the rendered complementary 2D image to the first 2D image or to a second complementary image to create a stereoscopic 3D image of the scene captured in the first 2D image.

m. Saving the rendered stereoscopic 3D image.

FIGS. 9A and 9B show another exemplary illustration of generating a 3D stereoscopic image from an original 2D image according to some embodiments of the present invention. In this example (FIG. 9A) there is a 2D image of a person stretching his right arm (105) towards the camera. In this example the length of the left arm (106) in the image is in anatomic proportion to the person's physical dimensions which may indicate that the left arm is approximately at the same plane as the rest of the body, which is at the same distance in relation to the camera. The image of the right arm (105) is shorter than the image of the left arm (106) which may indicate that the right arm is pointing towards the camera or raised backwards away from the camera. The palm and fingers of the right hand, however, are larger than the palm and fingers of the left hand and disproportionately large in relation to the person's physical dimensions which may indicate that the arm is pointing towards the camera. The relative size of the palm and fingers, and the length of the arm may indicate the relative distance of the right palm compared to the distance of the body from the camera.

According to some embodiments of the present invention, a second image may be extrapolated by shifting differently different parts of the body according to their relative distance from the camera. Parts of the body which are closer to the camera will be shifted more, and parts of the body which are further away from the camera will be shifted less.

FIG. 9B shows an example of the original image of the body of FIG. 9A which was captured by the camera marked 'a', and the generated complementary image marked 'b'. As can be seen from the figure, all parts of the body which are at approximately the same distance from the camera, were shifted equally to the left (marked "smaller shift"). The palm (107) of the right hand (105) was shifted left more than the rest of the body (marked "the larger shift"). The arm was shifted gradually to the left, from a shift equal to the rest of the body (marked the "smaller shift") near the shoulder, to the largest shift left near the palm (marked "the larger shift"). The captured image (suffixed 'a') may be displayed to the left eye, and the shifted image (suffixed 'b') may be displayed to the right eye to create a 3D stereoscopic view of the person.

According to further embodiments of the present invention, the above described process may be performed sequentially to a series of images (e.g. a video) in order to create a 3D video/film. According to yet further embodiments of the present invention, when performing the above described process on a series of images, data accumulated and calculations performed regarding a given image within the series may then be utilized in the process performed for sequential images (e.g. texture data regarding a portion of a given object collected from one image may then be used to create a modified angle of view of the given object in a second image in which the specific portion is hidden from view, depth information from one image may be used for a second image—when a stationary object is being analyzed or when a trajectory and velocity may be estimated, all as described in detail in the '958 Application,). Furthermore, some calculations may be performed upon a series of images in combination (e.g. object movement throughout a series of images may be used to ascertain data regarding the image).

According to some embodiments of the present invention, a stereoscopic 3D generating system for generating stereoscopic 3-dimensional images and/or video from 2-Dimensional images or video (shown in FIG. 2) may be functionally associated with or comprised of:

a. An apparatus for 3D representation of data as described in the '958 application.

b. A receiving module for receiving one or more and/or series of 2D image data sets, including storage means and/or buffers for storing the received image data;

c. A 3D representing apparatus interfacing module for receiving: (1) depth information relating to one or more objects appearing in the received images and/or (2) 3D models, or correlations to such models stored in an associated database, corresponding to one or more objects in the received images.

d. One or more discrete object identifying modules** which may be adapted to identify discreet objects (e.g. a table) and/or object elements (e.g. a table leg) within the received images;

e. An object characterizer** which may comprise processing logic for performing the processes described in par [0049] step c above. An object characterizer may be functionally associated with a distributed data network for communicating with exterior services that may assist in its function;

f. A reference model correlator**, which may comprise processing logic for correlating identified objects with appropriate reference models, as described above in par [0049] step d. A reference model correlator may be functionally associated with appropriate data storage containing models to be selected for this purpose and may further be functionally associated with a distributed data network for communicating with exterior services that may assist in its function (cloud based model correlation) and/or with a cloud based object recognition module which may be adapted to search an associated data network to retrieve and correlate appropriate reference models;

g. A model insertion unit** comprising processing logic for adapting reference models (including transforming, translating and scaling) to match the particular appearance of identified objects within received image data. This component is discussed in detail (skeletal insertion unit) in the '958 Application of which this application is a continuation in part and all relevant descriptions described therein may be relevant to this process, including the necessary modifications, and are hereby incorporated;

h. An object depth extrapolating/estimating module** comprising processing logic for determining the distance of each object and object element from the imaging device which captured the first image and/or in relation to each other and/or to a desired viewing point (as described in par [0049] step f above). Alternatively and/ or in parallel, an object depth extrapolating/estimating module may comprise processing logic for extrapolating/estimating the distance of each and/or a portion of the pixels within the image from the imaging device which captured the first image and/or in relation to each other. According to further embodiments, there may be provided a separate object depth extrapolating/estimating module or separate processing logic for determining the depth of modeled objects and non-modeled objects as described in par [0049] steps f(i) and f(ii) above;

i. A complementary image data calculator which may be comprised of: (1) a horizontal shift calculator comprising processing logic for calculating a shift to the right* for each object/object-element/pixel in an image, based on the determined distance of the object/object-element/pixel in the image, which shift may be applied to each object/object-element/pixel, in order to achieve a second viewpoint which may be viewed from the left eye (as described in par [0049] step g above); (2) a modification of AOV calculating unit for calculating a modification of the AOV which may be applied to each identified object/object-element in an image, based on the position of the object/object-element within the image and the determined distance of each object and object element from the imaging device which captured the image and/or in relation to each other and/or in relation to the desired viewpoint (all as described in par [0049] step h above);

j. A modified AOV generator** for generating a modified view of objects/object-elements, which modified view is modified based on a calculation performed by a complementary image data calculator. A modified AOV generator may comprise: (1) processing logic for generating modified angles of view of objects based on 3D models of the objects and different 2D projections of these models as described in the '958 Application of which this application is a continuation in part and all relevant descriptions described therein may be relevant to this component and are hereby incorporated herein. Furthermore, descriptions regarding the generation of modified angles of view of non-rigid objects within the '958 Application, may also be relevant to the present description relating to any object correlated to a 3D model, such that according to the same principles, with the necessary modifications, a modified AOV of any such object may be generated; and (2) processing logic for generating modified angles of view of non-modeled objects and/or objects correlated to models not containing the necessary data by copying or "stretching" pixels/texture of the edges of an object to create an illusion of a different angle of view of the object (as described in par [0049] step i above).

** throughout the present disclosure reference is made to the Applicant's U.S. patent application Ser. No. 11/742,958, titled "SYSTEM AND METHOD FOR 3D SPACE-DIMENSION BASED IMAGE PROCESSING", which is hereby incorporated into the present disclosure in its entirety. References within the present disclosure to skeletal 3D models of objects, the correlation of such models to objects, the matching of such models to objects and all calculations and extrapolations based on these models should be understood to refer to the teachings of the '958 application.

k. A complementary image data generator which may comprise processing logic for generating complementary 2D image data sets, representing a scene captured in a given 2D image, in which (1) each object/object-element/pixel is shifted to the right* from its position in the given 2D image based on a shift calculated for each object/object-element/pixel by a complementary image data calculator; and (2) a modified view of each object/object element is presented, which modified view is generated by a modified viewing angle generator in accordance with calculations of a complementary image data calculator;

l. A rendering module which may comprise processing logic for rendering image data sets generated by a complementary image data generator;

m. A stereoscopic image generator adapted to combine rendered complementary 2D images to the 2D images from which they were created or to second complementary 2D images to create stereoscopic 3D images of scenes captured in the original 2D images; and n. Ancillary modules and hardware, such as displays, data storage, user interfaces, controls and/or any other ancillary component which may assist in the operation of the system.

According to some embodiments of the present invention, characterization of objects and/or the subsequent correlation of reference models may include:

One or more matching/identification/recognition algorithms which may take into account known characterization information relating to image content (e.g. metadata tags indicating various parameters of the content such as title, actors, etc.) and/or previous characterization information when generating additional characterization information (e.g. metadata or characterization parameters) about the content. The known characterization information may be received with the content to be characterized, may be retrieved from an external database using search terms based on the characterization data received with the content, or may have been generated/derived by one of the one or more algorithms. Known characterization information may be used to tune, weight and/or otherwise constrain a given matching/identification/recognition algorithm according to some embodiments of the present invention. Characterization information generated by one of the one or more algorithms may be categorized as validated or unvalidated.

According to some embodiments of the present invention, unvalidated characterization information may be generated by the one or more algorithms during an initial matching/identification/recognition analysis iteration. The analysis during the initial iteration may be tuned, weighted and/or otherwise constrained by characterization information received with the content and/or retrieved from an external database. According to further embodiments of the present invention, any characterization information generated at a first point in time of the initial iteration may be used to tune, weight and/or otherwise constrain one or more algorithms at a later point in time of the first iteration.

According to further embodiments of the present application, some or all of the one or more algorithms may be used to perform a second iteration of analysis on the content, during which second iteration unvalidated characterization information generated during the first iteration may be either validated or invalidated. During the second iteration, some or all of the characterization information received with the content, retrieved from external sources and/or generated during the first iteration may be used to tune, weight and/or otherwise constrain one or more of the algorithms.

According to further embodiments of the present invention, content including more than one scene or more than one scene segment (e.g. several camera locations during the same scene) may be segmented such that boundaries between the scene/segments are defined and/or otherwise marked. The first, the second or both iterations of algorithmic analysis for characterization of the content may perform scene/segment segmentation and/or may take into account scene/segment boundaries for tuning, weighting and/or otherwise constraining analysis by one or more of the algorithms.

According to some embodiments of the present invention, there may be provided: (1) a content receiving module adapted to receive multimedia content to be characterized; (2) a metadata extraction module adapted to extract any tags or metadata characterizing the content already present within the received content (e.g. title of movie or T.V. show, list of actors, titles of any music in the content, etc.); (3) an external database query module adapted to search one or more (external) database resources (e.g. google, flixter, etc.) for additional characterization information relating to the received content (e.g. if only the title of a movie/show is known, a list of characters and associated actors may be retrieved. Face images and voiceprints of known actors/characters may be retrieved, etc.); (4) one or more clusters of processing logic engines (e.g. processors) adapted to run one or more matching/identification/recognition algorithms adapted for: (a) Sound movement tracking (estimate object position), (b) Face recognition (try to match face to actors in the movie), (c) voiceprint recognition (i.e. speaker identification of who is speaking), (d) Object tracking (movement, position), (e) Speech recognition (speech to text conversion), (f) Sound effect recognition (identify explosions, aircraft, helicopter, etc.), (g) Object recognition (bottles, cans, cars, etc.), (h) Motion recognition (character movement, object movement, camera movements, etc); and (5) a data handling module adapted to receive characterization data from and to provide characterization data to the one or more algorithms (e.g. interface to database application including database with a database including tables to store characterization data received with the content, received from the global database(s), and generated by the one or more algorithms).

In other words, characterization of objects, according to some embodiments of the present invention, may take into account contextual data relating to the given scene.

It should be clear that systems and methods, in accordance with different embodiments of the present invention may include many different possible combinations of the above described components, accordingly providing different combinations of features. It should also be understood by one of skill in the art that some of the functions described as being performed by a specific component of the system may be performed by a different component of the system in other embodiments of this invention.

In the description and claims of embodiments of the present invention, each of the words, "comprise" "include" and "have", and forms thereof, are not necessarily limited to members in a list with which the words may be associated.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

I claim:

1. A method for generating a stereoscopic image comprising:

receiving, by receiving circuitry, a first 2-dimensional (2D) image data set representing a 2D image of a scene;

automatically identifying, by use of processing circuitry, a first non-rigid object within the first 2D image data set;

automatically identifying, by use of the processing circuitry, one or more elements of the first non-rigid object, within the first 2D image data set;

automatically correlating and matching, by use of the processing circuitry, a 3-Dimensional (3D) skeletal model with the first non-rigid object, by automatically correlating, by use of the processing circuitry, elements of the 3D skeletal model with the identified elements of the first non-rigid object;

automatically determining, by use of processing circuitry, depth data relating to the first non-rigid object based at least partially on the correlated skeletal model; and automatically calculating, based on the determined depth data relating to the first non-rigid object, shifts of position, within the scene, of the identified elements of the first non-rigid object, which shifts correspond to a second viewing angle of the scene, which second viewing angle approximates a viewing angle of a second human eye viewing the scene in 3-Dimensions; and automatically generating, by use of processing circuitry, a stereoscopic image of the scene by generating a complementary 2D image data set depicting the scene from the second viewing angle, wherein said generating a complementary 2D image data set comprises replicating the 2D image data set while shifting positions of objects in the scene according to their depth to account for the difference in viewing angle, including shifting positions of the identified elements of the first non-rigid object, within the scene, according to the calculated shifts.

2. The method according to claim 1, further comprising performing the steps of the method according to claim 1 upon a series of images, which series of images comprise a video sequence.

3. The method according to claim 1, further comprising creating a stereoscopic image of the scene by combining the complementary 2D image data set and the first 2D image set.

4. The method according to claim 1, further comprising generating a stereoscopic image of the scene by combining the complementary 2D image data set and a second complementary 2D image set generated, according to the steps of the method of claim 1, from the first 2D image data set.

5. The method according to claim 1, further comprising modifying, based at least partially on the 3D skeletal model, the appearance of the first non-rigid object, such as to represent the appearance of the first non-rigid object from the second viewing angle.

6. The method according to claim 1, further comprising identifying a rigid object within the first 2D image set and estimating a depth of the rigid object based on a spatial relationship between the rigid object and the first non-rigid object.

7. The method according to claim 1, further comprising modifying the appearance of a rigid object within the first image data set to correspond to a second viewing angle by copying the texture of one or more pixels along the edge of the rigid object, to neighboring pixels.

8. The method according to claim 1, wherein said method is performed in real time.

9. A system for generating a stereoscopic image comprising:

a receiving module comprising processing circuitry for receiving a first 2-dimensional (2D) image data set representing a 2D image of a scene;

a discrete object identifying module comprising processing circuitry functionally associated with said receiving module for automatically identifying a first non-rigid object within the first 2D image data set;

a feature identifying module comprising processing circuitry for automatically identifying one or more elements of the first non-rigid object, within the first 2D image data set;

a reference model correlator comprising processing circuitry functionally associated with said identifying module and said feature identification module for automatically correlating and matching a 3-Dimensional (3D) skeletal model with the first non-rigid object, by automatically correlating elements of the 3D skeletal model with the identified features of the first non-rigid object;

an object depth estimating module comprising processing circuitry for automatically determining depth data relating to the first non-rigid object based at least partially on the correlated skeletal model; and a horizontal shift calculator comprising processing circuitry for automatically calculating, based on the determined depth data relating to the first non-rigid object, shifts of position, within the scene, of the identified elements of the first non-rigid object, which shifts correspond to a second viewing angle of the scene, which second viewing angle approximates a viewing angle of a second human eye viewing the scene in 3-Dimensions; and a rendering module comprising processing circuitry for automatically generating a stereoscopic image of the scene by generating a complementary 2D image data set depicting the scene from the second viewing angle, wherein said generating a complementary 2D image data set comprises replicating the 2D image data set while shifting positions of objects in the scene according to their depth to account for the difference in viewing angle, including shifting positions of the identified elements of the first non-rigid object, within the scene, according to the calculated shifts.

10. The system according to claim 9, further comprising a modified angle of view generator comprising processing circuitry for modifying, based at least partially on the 3D skeletal model, the appearance of the first non-rigid object, such as to represent the appearance of the first non-rigid object from the second viewing angle.

11. The system according to claim 9, further comprising a modified angle of view generator comprising processing circuitry for modifying the appearance of a rigid object within the first image data set to correspond to the second viewing angle by copying the texture of one or more pixels along the edge of the rigid object, to neighboring pixels.

* * * * *